Oct. 25, 1927.
W. P. REAVES
1,647,016
OPTICAL APPARATUS
Filed Sept. 20, 1922  7 Sheets-Sheet 4
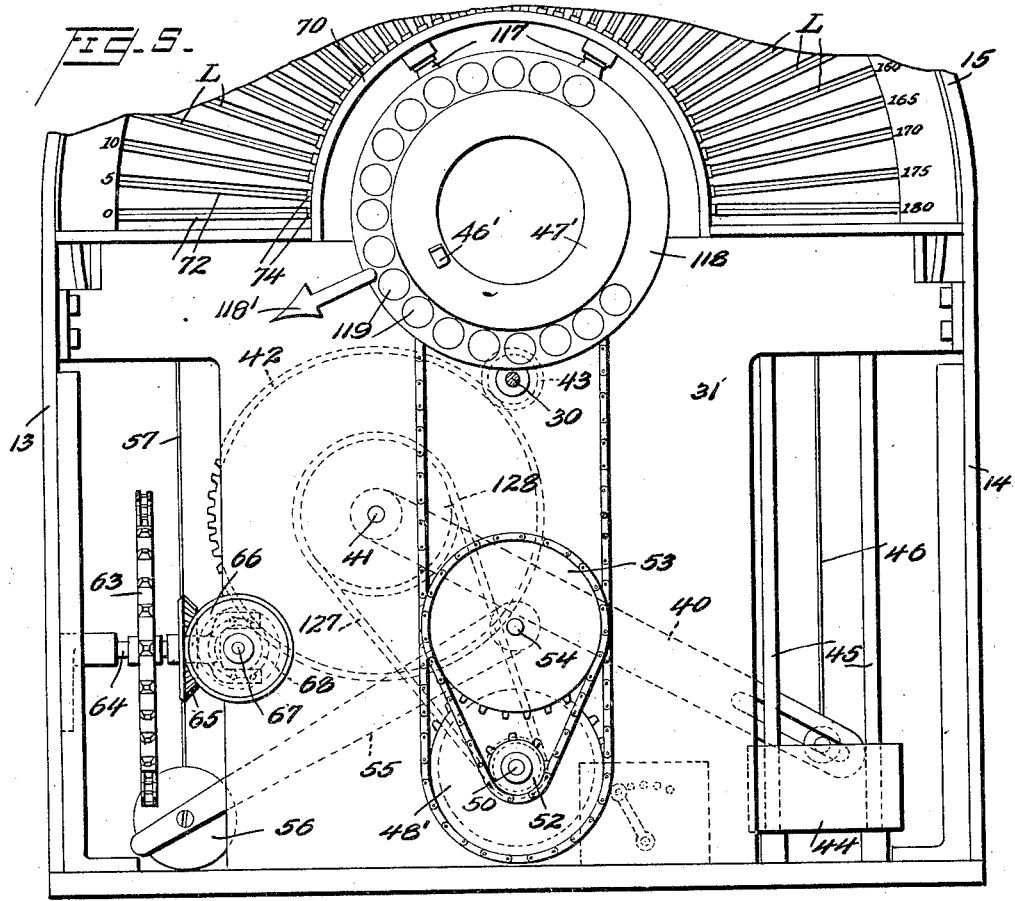
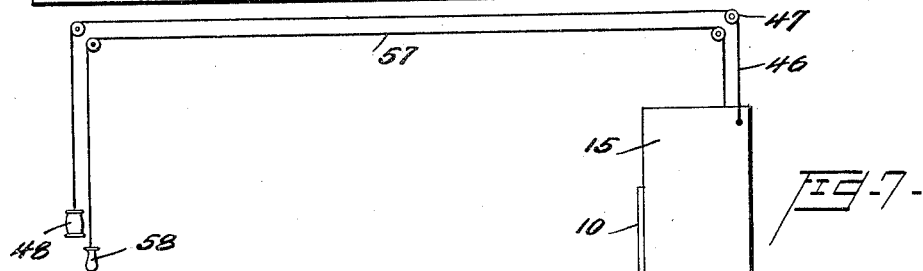
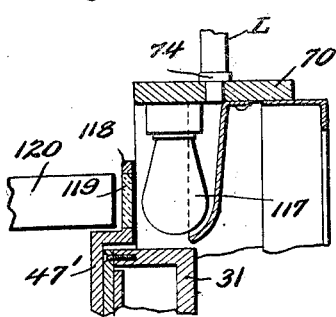
Inventor
William P. Reaves,
By Watson, Cait, Morse & Grindle,
Attorney

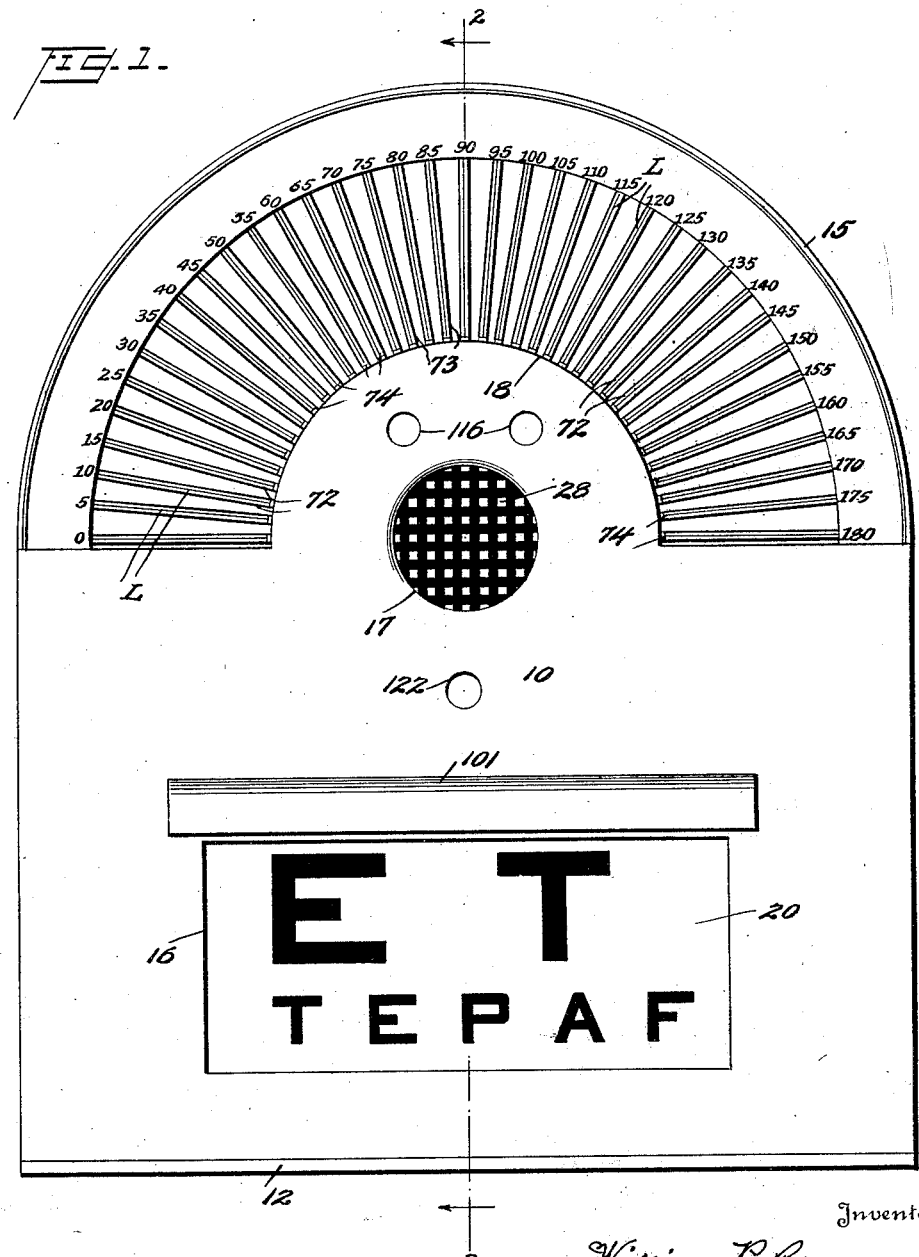

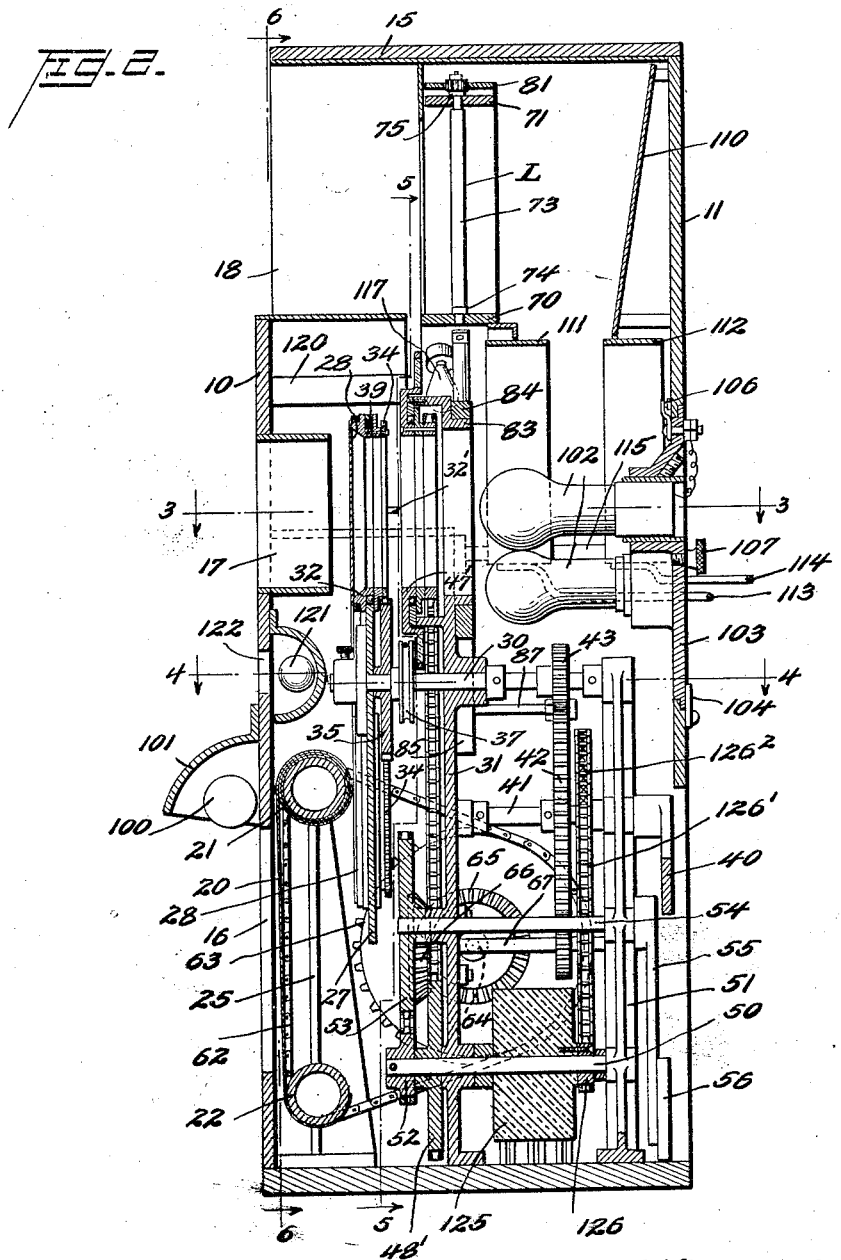

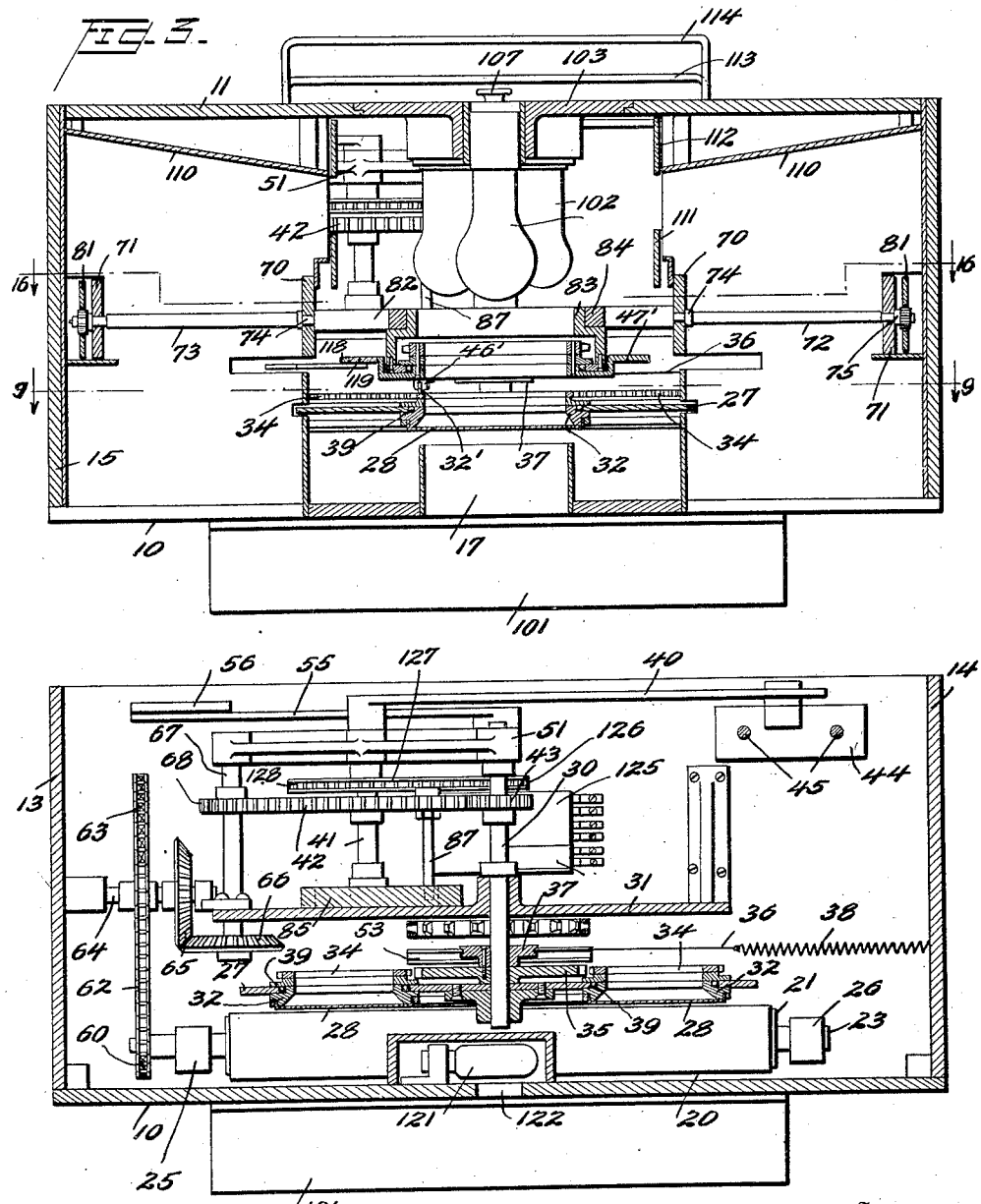

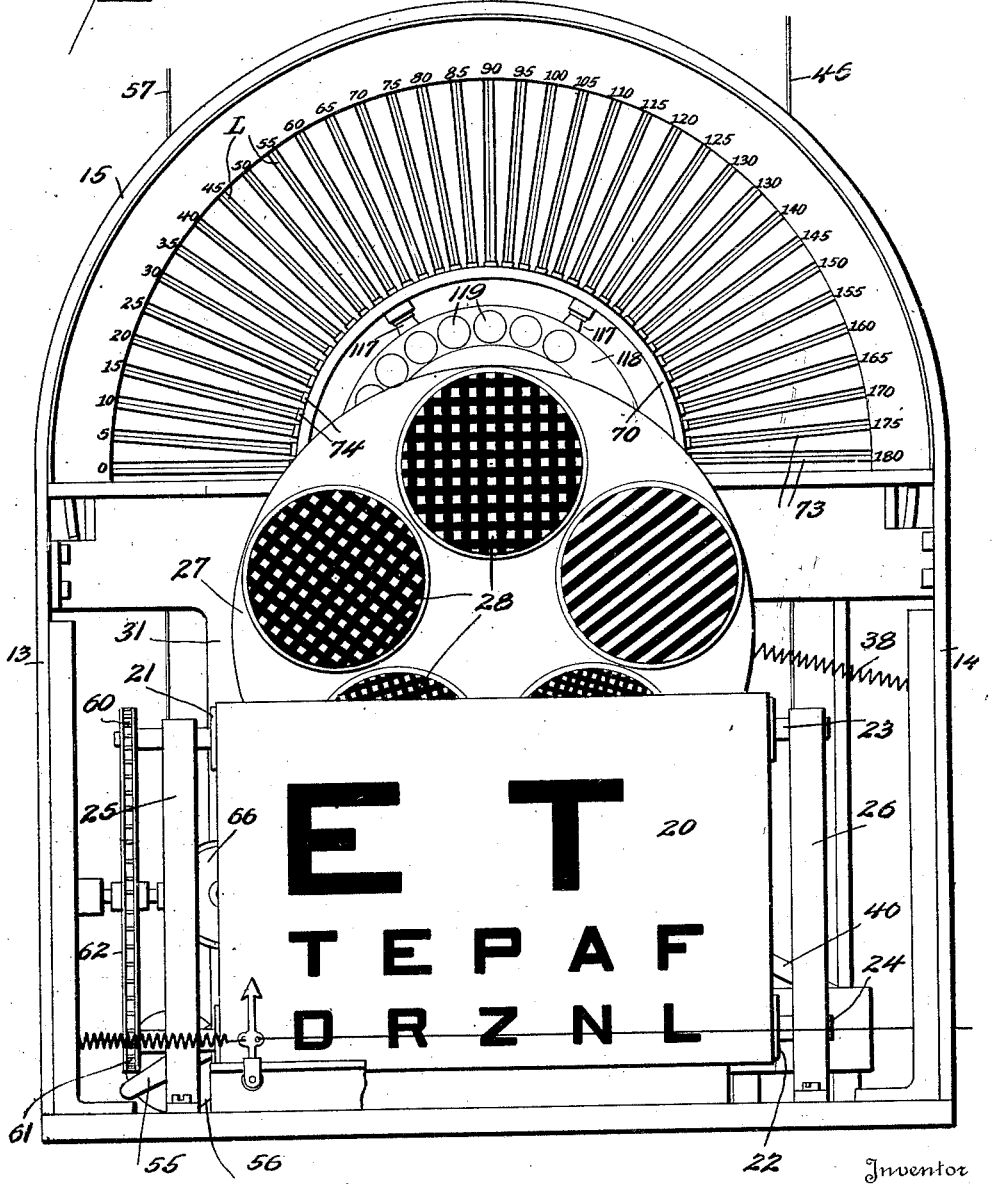

Oct. 25, 1927.
W. P. REAVES
1,647,016
OPTICAL APPARATUS
Filed Sept. 20, 1922 7 Sheets-Sheet 6
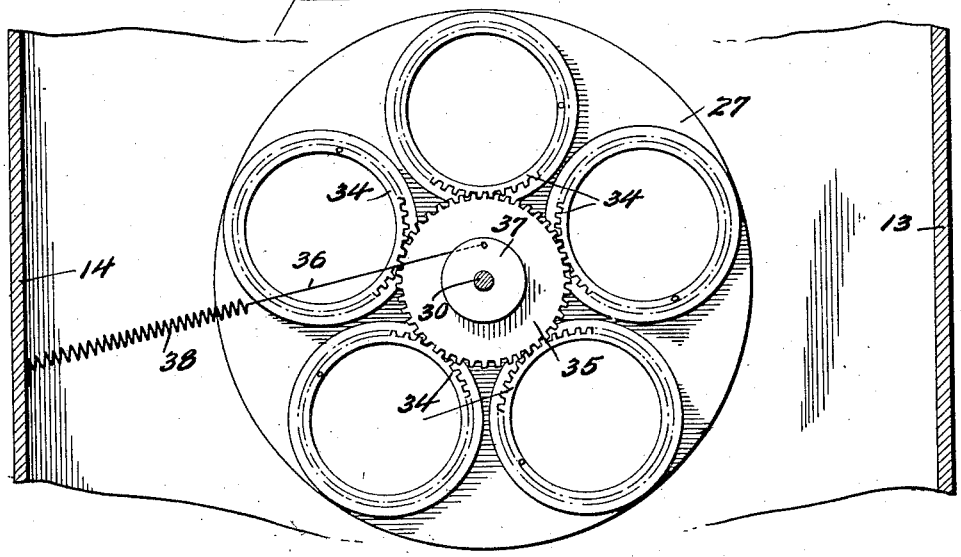
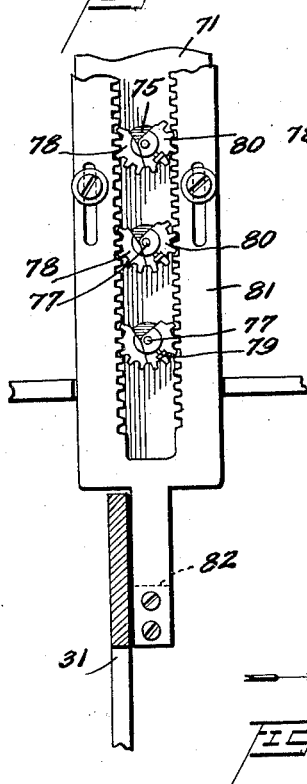
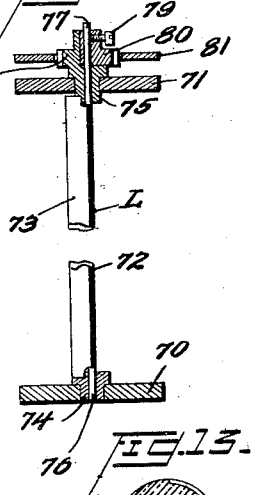
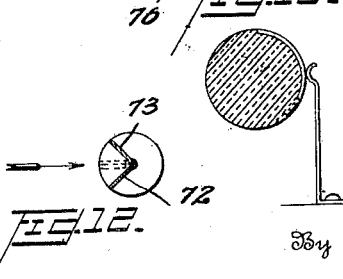
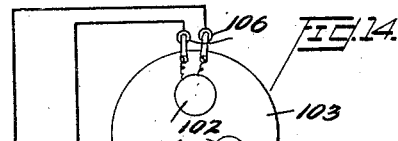
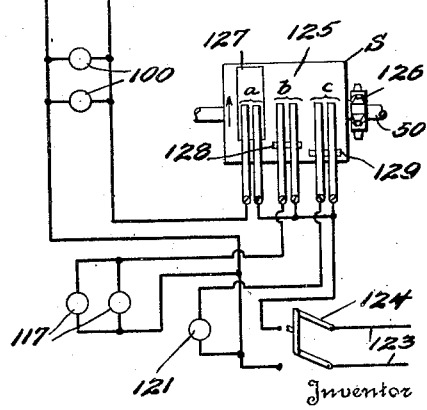
Inventor
William P. Reaves,
By Watson, Coit, Morse & Grindle,
Attorney

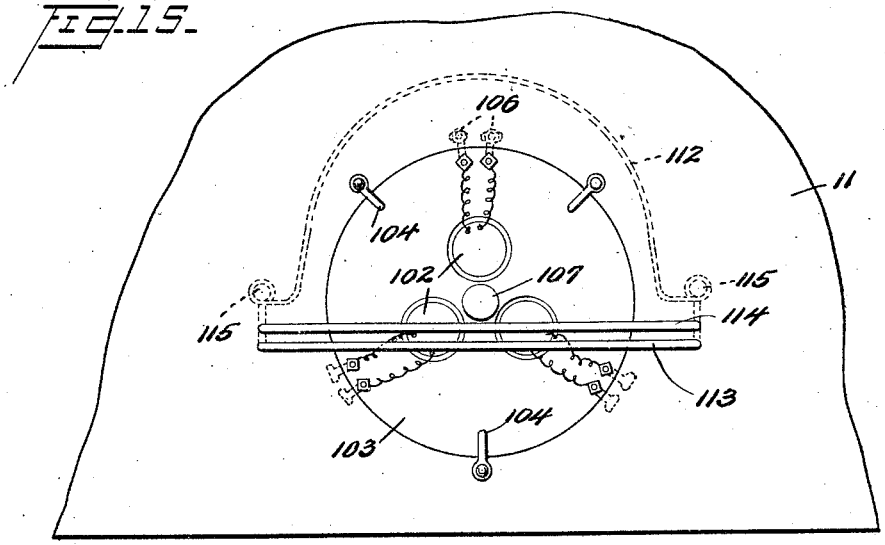
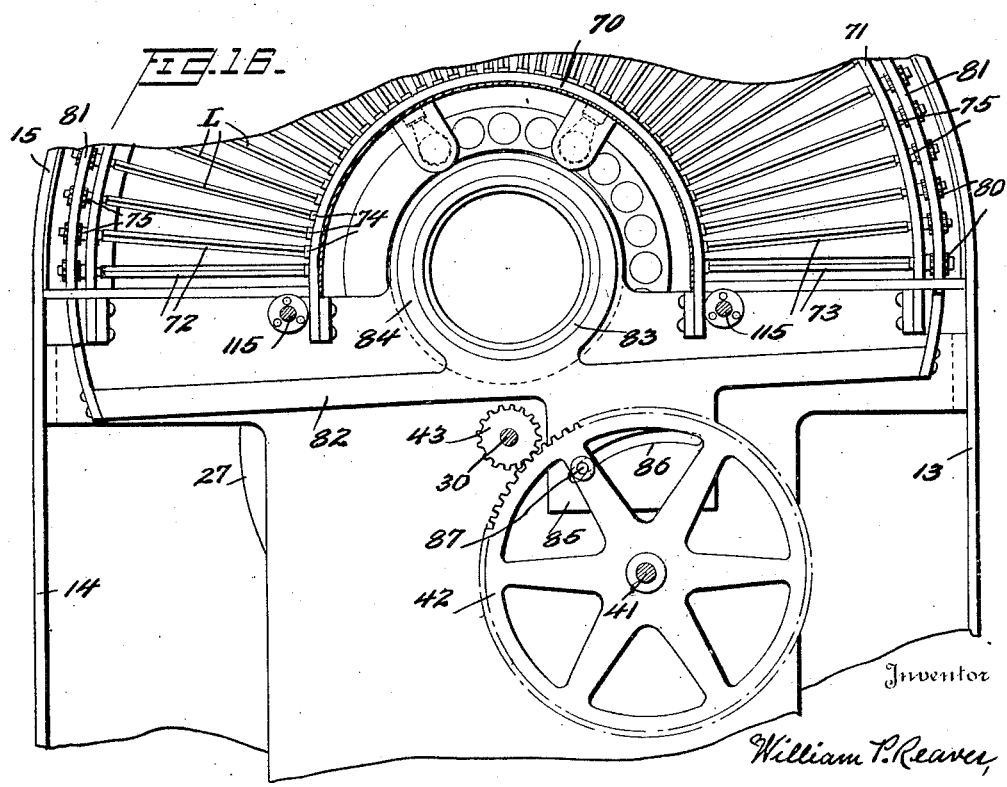

Patented Oct. 25, 1927.

1,647,016

UNITED STATES PATENT OFFICE.

WILLIAM P. REAVES, OF GREENSBORO, NORTH CAROLINA.

OPTICAL APPARATUS.

Application filed September 20, 1922. Serial No. 589,463.

The present invention relates to an apparatus for testing visual acuity.

The object of the invention is to provide a convenient apparatus of the cabinet type having a number of elements for subjecting a patient to a series of tests of vision, the elements being of the general type well known to refractionists, such as a chart having letters or objects inscribed thereon of different size as measured in visual acuity units, a meridian dial and a rotatable astigmatic chart, these elements being associated, however, in a novel combination and being adapted to be controlled by the examining refractionist from a testing point whereby they may be operated simultaneously or in conjunction with each other. Associated with these elements is means for controlling the degree of their illumination and also means for testing the ability of the patient's eyes to recognize various colors. These last mentioned means are also manipulated by the refractionist from a distant point, preferably from a position at the side of the patient so that he is enabled to present these tests in rapid succession and without movement which might tend to distract the patient's attention. The refractionist is thus stationed at the most advantageous point for conducting the test, having at hand means for controlling the machine which is located some distance away and also having within reach the various test lenses commonly used in the correction of defects of vision, as well as being conveniently placed to enter the data obtained by the test upon suitable record sheets.

As previously pointed out, the invention contemplates the use of a chart, a meridian dial and a rotatable astigmatic chart, these elements being coordinate and operatively connected for simultaneous operation. The main chart has thereon a series of letters or objects, the astigmatic chart a series of disks, each having lines inscribed thereon in one or two directions, or other test objects, and the meridian dial consists in a series of lines radiating from a common center, which is the center of the astigmatic chart, these lines being arranged at intervals of 5° around a complete semicircle. The chart is mounted upon rollers and has a plurality of letters or test objects thereon, the astigmatic chart has a plurality of lines, squares, or objects, and the radial lines of the meridian dial are variable in width, the three test objects being so coordinate that they present to the eye simultaneously lines of equal value when measured in visual acuity units. The refractionist is enabled by manipulation of his controls to simultaneously move the test chart, the astigmatic chart, and to vary the width of the lines of the meridian dial, but at least one line of letters or objects on the test chart will be of the same value when measured in visual acuity units as the lines of the astigmatic chart and the meridian dial. The patient is therefore presented simultaneously with three test devices of the same value, having vertical, horizontal or oblique dimensions so that the error of his refraction in any meridian may be obtained by the use of test lenses.

In general, his attention is first directed to the chart, then to the dial, and then to the astigmatic chart, but this order may be varied as desired. By the aid of a test chart a test is given which shows the acuteness of vision to the unaided eye. The refractionist by the use of the chart and with test lenses of the usual kind is enabled to reach certain conclusions as to his patient's acuity of vision. If the eye has equal resolving power in all meridians the error is measured by spherical lenses. When the eye has unequal resolving power the difference of the errors in the two principal meridians is measured by the cylindrical lenses. This is a subjective test of the eyes by the use of lenses and test card. The accuracy of the test is increased by combining with it the objective test of the dial and disc. A more delicate test is by the dial, the black lines being a groove or V shape which prevents reflexes or halations and make them appear intensely black, and by increasing the sensitivity of the lines by varying the visual angle subtended and varying the intensity of illumination of the white back ground. The apparatus therefore includes means for varying, not only values of the test objects as measured in visual acuity units, but also the illumination, so that the patient's eyes may be tested for high and low illuminations. The invention may be embodied in machines of widely different character and the machine disclosed in the following description and in the accompanying drawings is given by way of example only, it being understood that the principles disclosed may be embodied in various forms of apparatus.

In the drawings:

Fig. 1 is a front elevation of the apparatus;

Fig. 2 is a section on line 2—2 of Fig. 1;
Fig. 3 is a section on line 3—3 of Fig. 2;
Fig. 4 is a section on line 4—4 of Fig. 2;
Fig. 5 is a section on line 5—5 of Fig. 2;
Fig. 6 is a section on line 6—6 of Fig. 2;
Fig. 7 is a side view of the machine showing the control means;
Fig. 8 is a detail view;
Fig. 9 is a section on line 9—9 of Fig. 3;
Figs. 10, 11, 12 and 13 are details;
Fig. 14 is a diagrammatic representation of the lighting mechanism;
Fig. 15 is a view of a portion of the apparatus as seen from the rear of the casing; and
Fig. 16 is a section on line 16—16 of Fig. 3;

The casing in which the several test objects and mechanism for operating the same are housed may be formed in any convenient manner. In the present instance the casing has a box-like lower portion and a semicylindrical upper portion, as clearly shown in Figs. 1 and 2. The front face of the casing is indicated at 10, the rear face at 11, and the side plates at 13 and 14 respectively. The upper edges of the front and rear plates are semicircular and parallel and the semicylindrical cover or hood member 15 has its edges secured to the edges of these plates respectively. The front plate 10 is provided with three major openings, a lower rectangular opening 16, a central circular opening 17, and an upper opening 18 in the form of a semicircular and relatively wide slot, these three openings constituting view openings through which the test objects may be seen from the front of the apparatus. Through the upper openings 18 the patient may observe a series of blades or lines equal in width and disposed along lines radiating from a common center and spaced 5° apart throughout a half circle. Through the central opening the patient may observe a chart element having a line, object, or series of lines thereon which may be arranged at right angles, the several lines being of equal width, and through the lower opening 16 may be observed one or more lines of letters or objects of a chart.

In Fig. 6 the cabinet is shown as it would appear from the front if the face plate were removed. It will be seen that the letter chart 20 is of a flexible nature, its ends being secured to rolls 21 and 22, the axles 23 and 24 of which are parallel and are journaled in the pedestals 25 and 26. Lines of letters are inscribed or engrossed on the chart, which letters vary in size from very large letters to very small ones, as is usual in eye testing charts of this character.

The astigmatic chart comprises a disk 27 rotatable about a fixed axis and having thereon a series of smaller disks or chart elements 28 which are rotatable relatively to the large disk. These chart elements have lines inscribed thereon as shown, the lines being of different widths on the different disks, but it will be understood that lines or test objects of any desired character may be inscribed on the chart elements. Only one disk is visible to the observer at a time and the arrangement is such that as this disk comes into register with the view opening 17 the lines of the disk will be horizontally and vertically disposed and the movements of the astigmatic chart and the main or letter chart 20 are so synchronized that the lines of the visible chart element 28 have the same value as measured in visual acuity units as at least one visible line of letters of the main chart 20.

The meridian dial comprises a series of blades L radiating from a common center, which in this case is coaxial with the center of the visible chart element 28, and the arrangement is such that the seeming width of the meridian lines may be varied so that these lines have at any one time the same value, as measured in visual acuity units, as the lines of the visible chart element 28, or one line of letters of the letter chart 20. By means of a single cord, which may be manipulated by the refractionist from his position adjacent the patient's side, three test devices may be simultaneously manipulated to present test objects of different values, as desired, and the mechanism for performing this function will now be described in detail.

Referring particularly to Fig. 2 it will be seen that the disk 27 upon which the chart elements 28 are rotatably mounted is secured to a rotatable shaft 30 mounted in the vertically disposed plate or bracket 31. The circular frames 32 to which the disks or chart elements 28 are secured are mounted in ball bearings 39 which permit their free rotation relatively to the main supporting disk 27. Each frame 32 is provided with a toothed wheel 34 at its rear and the toothed wheels of all of the chart elements 28 mesh with a central gear wheel 35 which is loosely mounted on the shaft 30 but is normally held from rotation. The means for normally preventing rotation of gear 35 comprises a cord 36, one end of which is secured within the groove of a pulley wheel 37 rigidly attached to the gear 35, and the other end of which is connected by a spring 38 to the side wall of the frame. Rotation of disk 27 therefore causes rotation of all of the chart elements 28, but the gears 34 and 35 are so designed that as each chart element 28 comes into register with the opening 17 the lines inscribed thereon will be horizontal or vertical or will occupy a desired definite position.

Rotation of disk 27 is effected by means of an operating lever 40 one end of which is secured to the shaft 41 which shaft is operatively connected to the shaft 30, the large gear 42 rigidly secured on shaft 41 meshing with pinion 43 secured on shaft 30. A slight rotation of shaft 41 will effect a considerable movement of disk 27, as can be seen from the arrangement of gears disclosed. To the free end of lever 40 is attached a weight 44 with a pin and slot connection, which weight is slidable vertically on guides 45. A cord 46 is attached to the end of the lever and passes vertically upward through the top of the housing and thence over pulleys 47 to the handle-weight 48, which exactly balances the weight 44. The operator may, by moving the weight 48 vertically move the weight 44 a corresponding distance to bring the desired chart element 28 into view, and upon removing his hand this chart element will remain in the position to which it has been adjusted since weights 44 and 48 exactly balance each other.

In testing eyes for astigmatism the refractionist may desire to rotate the chart element visible to the patient so that lines of any degree of obliquity may be presented. Means is therefore provided whereby each chart element may be rotated at the will of the operator after it comes into register with the view opening 17. It will be seen that to the rear of each frame 32 is secured a pin 32′. This pin is adapted to be engaged by a catch 46′ secured upon an annular frame 47′ mounted in ball bearings in a suitable aperture in the plate or pedestal 31. Rotation of frame 47′ results, therefore, in rotation of frame 32 and of the chart element 28. The frame 47′ has a chain which operatively connects the same to the gear 48′ rigidly mounted on shaft 50, rotatably supported on pedestals 31 and 51. Also rigidly secured on this shaft is a pinion 52 meshing with a gear 53 rigidly secured to a second shaft 54 rotatably mounted on the pedestals 31 and 51. To the opposite end of the shaft 54 is secured an operating lever 55, clearly shown in Fig. 5, the free end of which has secured thereto a weight 56. The end of a cord 57 extending through the casing and over pulleys to the operating handle 58 is fastened to the end of lever 55. The operating lever 55 may be raised by pulling downward on the handle 58, which balances weight 56, and lowered by raising weight 58. The frame 47′ is normally positioned as shown in Fig. 5 and it will be understood that in this position the catch 46′ lies below the path of movement of the pins 32′ around the shaft 30 so that no interference exists between the pins 32′ and this catch, but the catch is in position to engage the pin 32′ of any chart element in register with the aperture 17 and to effect rotation of this element when frame 47′ is rotated.

Rigidly mounted on shafts 23 and 24 which support the main chart, are pinions 60 and 61, and extending around these pinions is a chain 62 which also extends rearwardly and around a sprocket wheel 63 rigidly mounted on a shaft 64. The shaft 64 also has thereon a bevel wheel 65 which in turn meshes with a second bevel wheel 66 secured on shaft 67. The pinion 68 is also secured on shaft 67 and meshes with the main gear 42 so that as the gear 42 is rotated to effect rotation of disk 27 simultaneous movement is imparted to the chart 20, and the gearing is so arranged and designed that for any movement or rotation of the astigmatic chart, such movement is imparted to the main chart that at least one row of letters of the main or letter chart have a value equal to the lines of the chart element 28 which is visible through the aperture 17, as previously pointed out.

The meridian dial is described and claimed in my copending application Serial No. 579,235, filed August 2, 1922, but its peculiar combination with the other elements of the eye testing apparatus will be herein brought out. In Figs. 11 and 12 details of the radiating blades are clearly shown. The blades extend radially between two concentric semicircular frame members 70 and 71 and are spaced 5° apart. While from the front of the machine the blade appears to be a single member and perfectly flat, it will be seen from the detailed drawings that each blade in reality comprises two portions 72, 73 arranged to swing relatively to each other from an open position, shown in full lines in Fig. 12, to closed position, shown in dotted lines in this figure. As seen from the front the blades appear as single lines and may be made to appear either very narrow or quite broad, depending upon the adjustment. Bushings 74 and 75 are rotatably mounted in the frame members 70 and 71 respectively. The blade portions 73 have their ends rigidly secured to these rotatable bushings and blade portions 72 have secured to their ends spindles 76 and 77 which extend through axial apertures in bushings 74 and 75. The blade portions are therefore rotatable relatively to each other and also to the supporting frame members.

Secured to the bushing 75 is a segment 78 of a gear and adjustably secured by means of a screw 79 to the spindle 77 is a second gear segment 80. These gear segments are cut away as shown in Fig. 10 so that they may have some relative movement of rotation. The two segments mesh with oppositely facing racks formed on a semicircular rack member 81, the arrangement being such that movement of this rack member longitudinally results in opening and closing of the blades. The blades are so positioned that an observer in front of the machine sees directly into a V-shaped space between them, in other words, he is looking into an aperture from which no reflection of light is possible.

The ends of the semicircular rack 81 are secured to a rocking beam 82 clearly shown in Fig. 16, which beam is hung from the flange 83 of the pedestal 31 by the annular strap 84 so that it may be rotated about the center from which the blades of the meridian dial radiate. Secured to the beam 82 is a plate 85 having a cam slot 86 therein. A pin 87 projects from the gear 42 and extends into this cam slot. Rotation of gear 42 therefore effects movement of the beam 82 and hence opening and closing of the blades of the meridian dial. The cam is so designed that for all adjustments of the lever 40 the blades have the same value to the observer, measured in visual acuity units, as at least one line of letters on the main chart, and the lines or objects on the visible chart element 28.

The main chart 20 is illuminated by means of two bulbs 100 provided with a light shield 101. The chart elements 28 are translucent and are illuminated from behind by one of the three bulbs 102, any one of which may be placed axially of the view aperture 17. It will be seen that these three bulbs 102 are mounted upon a circular plate 103 rotatably supported in a circular aperture in the back plate 11 of the casing and removably secured therein by clamps 104. The axis of the plate 103 is eccentric to the axis of the view aperture 17 and by rotating the plate 103 any one of the three lamps may be placed axially of the view aperture. Each lamp has two contacts connected thereto and these contacts are adapted to be successively brought into electrical contact with a pair of stationary contacts 106 secured to the plate 11. The arrangement is such therefore that only that lamp is illuminated which is coaxial with the view aperture. The three lamps are of different intensities so that the degree of illumination may be varied at the will of the operator. The plate 103 may be turned by means of a knob 107 and the switching of the lamps into and out of electrical circuit is automatically performed.

A light background for the meridian dial is indicated at 110. This dial is semicircular and is illuminated by one of lamps 102 so that the blades of the meridian dial appear as black lines silhouetted against a luminous background. For controlling the amount of light thrown on the background 110 by the lamps 102 I have provided two relatively movable semicircular light shields 111 and 112 which may be operated from the rear of the casing by means of handles 113 and 114 respectively. The shields 111 and 112 slide along bars 115 and the gap between the adjacent edges of these shields may be varied as desired.

Associated with the mechanism for rotating the astigmatic chart elements 28 is the color testing means. In Fig. 1 it will be seen that two small apertures 116 are provided in the face plate 10 immediately above the aperture 17. Behind these openings are positioned small electric lamps 117 which are secured to the frame member 70. Interposed however between the lamps 117 and the view apertures 116 is an annular flange 118 on the rotating annular frame 47'. Secured in this flange are a number of color test lenses 119 so that when these lamps are lighted and the frame 47 is rotated by means of the lever 55, different colors may be observed from the front. It is essential to present a plurality of colored lights simultaneously to the observer's eyes in making color tests for the sake of contrast. Thus in the ordinary tests for color blindness a plurality of colors are presented to the patient's eye simultaneously and he is required to distinguish the different colors and shades. The ability to distinguish between two colors simultaneously presented to the eye is important, as will be obvious, and such test is required in examining the visual capacity of candidates for admission into the Army and Navy and also candidates for employment by the railroads. Tubes 120 extend rearwardly from the apertures in the face plate, terminating just in front of the flange 118, which tubes prevent leakage of light from the lamps 117 to the other view apertures, and which also serve to shut out rays of light from the bulb 102 when the color is not being used, so that the patient will see no colors through the apertures 116. It will be understood that the lamps 117 are shielded to prevent the passage of light rays rearwardly. A pointer 118' is fastened to the flange 118 in a radial line with the catch 46' and is adapted to cooperate with the blades L of the meridian dial for the purpose of pointing out any particular one to the patient. By reason of the fact that it is in line with the catch 46', it will also serve to indicate the amount of rotation, in degrees, of any one of the astigmatic chart elements 28 by pointing to a blade L which has its inclination marked as shown.

A single lamp is illustrated at 121 which may be observed, when lighted, through a small view aperture 122. This lamp is preferably red and may be used to assist in making the well known muscle test for the eyes.

When the lamp 121 is lighted it will be understood that the other lamps are not lighted.

In Fig. 14 a diagram of the lighting circuits is shown. The machine is adapted to be lighted from the ordinary house electric lighting circuit, the mains of which are indicated at 123 and a main control switch at 124. The positions and circuits of the several lamps above described are indicated and it will be seen that a barrel switch S is provided for controlling the circuits through the several groups of lamps. The switch S comprises essentially a cylinder of fiber or insulating material 125 which, as shown in Fig. 2, is loosely mounted on the shaft 50. To the cylinder 125 is rigidly secured a pinion 126 which is connected by means of a chain 126' to a large gear 126² rigidly secured on the shaft 41. As a result, rotation of the barrel switch is effected by movement on lever 40 and hence simultaneously with movement of the several charts.

The contact plates on the surface cylinder 125 are indicated at 127, 128, 129. A pair of spring fingers $a$ cooperate with the plate 127, a second pair $b$ cooperate with plate 128, and a third pair $c$ cooperate with plate 129. When the contact fingers $a$ are in electrical contact with the plate 127, the main chart lights 100 and one of the central lights 102 are illuminated. The color lights 117 and the muscle test light 121 are not. The plate 127 is of considerable length and this contact is maintained for all adjustments of the test objects up to substantially a maximum. At a certain point in the movement of the lever 40, that is, as the lever is approaching its limit of travel in one direction, the contact plate 127 disengages spring fingers $a$ and the circuit through the lamp 102 and the lamps 100 is broken. Immediately thereafter contact is made by the spring fingers $b$ with the plate 128 and the color test lamps are lighted. Movement of the lever 40 may be discontinued here and the patient's eyes subjected to color tests. After the completion of such color tests the lever 40 may be further moved a slight distance whereupon the lamps 117 are extinguished and the lamp 121 lighted for the muscle test. When all tests are completed the main switch 124 may be opened.

To one skilled in the art the many advantages of the apparatus above described will be apparent and it will also be obvious that the principles of the invention may have numerous different embodiments of which that disclosed is an example.

Having thus described my invention, what I claim as new and desire to secure by Letters Patent is:

1. In an eye testing apparatus of the class described, in combination, a support, a plurality of chart elements each having one or more symbols thereon by means of which the eyes of an observer may be subjected to an objective test, a member movably mounted on the support and upon which the chart elements are mounted for rotation about their individual axes, the movable member being designed and constructed to bring the chart elements successively to the same position for successive observation, and means for rotating the chart element under observation about its axis, for the purpose set forth.

2. In an eye testing apparatus of the class described, in combination, a support, a plurality of disk-like chart elements each having one or more symbols thereon by means of which the eyes of an observer may be subjected to an objective test, a member pivotally mounted upon the support and upon which the chart elements are mounted for rotation about their individual axes, the rotatable member being designed and constructed to bring the chart elements successively to the same position for successive observation, and means for rotating the chart element under observation about its axis, for the purpose set forth.

3. The combination set forth in claim 2 in which the means for rotating the chart element under observation effects the simultaneous rotation of all the chart elements as said member rotates on its axis.

4. In an eye testing apparatus, in combination, a movable supporting member, a plurality of individual chart elements mounted for rotation on said member, and means positioned adjacent said movable support for engaging and rotating one of said chart elements brought into position to be engaged thereby.

5. In an eye testing apparatus, in combination, a meridian dial having a plurality of members whose effective thickness as seen from the front can be varied, a movable chart having a plurality of chart elements with test lines thereon of different values, and means for simultaneously operating said dial and chart.

6. In an eye testing apparatus, in combination, a meridian dial having a plurality of radially disposed blades, a field or background spaced to the rear of said dial, and means for illuminating said field, comprising a lamp positioned on the axis of said dial.

7. In an eye testing apparatus, in combination, a movable member having a plurality of chart elements thereon, a movable letter chart, and connections between said member and chart whereby they may be operated in synchronism for the purpose of bringing into the observer's vision symbols of the same value as measured in visual acuity units.

8. In an eye testing apparatus, in combination, a meridian dial having blades of variable width, a movable member having a plurality of chart elements thereon, and means for moving said member and varying the width of said blades in synchronism for the purpose of bringing into the observer's vision symbols of the same value as measured in visual acuity units.

9. In an eye testing apparatus, in combination, a meridian dial having blades of variable width, a movable member having a plurality of chart elements thereon, a movable main or letter chart, and means for operating said dial, member and letter chart in synchronism for the purpose of bringing into the observer's vision symbols of the same value as measured in visual acuity units.

10. In an eye testing apparatus, in combination, a meridian dial having blades of variable width, a movable member having a plurality of chart elements thereon, lines of different width being inscribed thereon, a movable chart having letters of different widths thereon, and means for simultaneously operating the dial member, and chart so that objects of the same value as measured in visual acuity units are presented to the observer.

11. In an eye testing apparatus, a plurality of movable members each having test objects inscribed thereon of different values, and means for moving said members to present different test objects to the eye of an observer, said means coordinating said movable members so that at least two spaced test objects, one being on each member, have the same value as measured in visual acuity units to check one against the other.

12. In an eye testing apparatus, in combination, a stationary plate having two apertures, a lamp behind each aperture and a rotatable member intermediate the lamps and apertures and having a series of colored lenses therein whereby an observer in front of the plate will see colored lights through said apertures.

13. In an eye testing apparatus, in combination, a casing, a plurality of eye testing devices within the casing, mechanical means also within the casing thru which said eye testing devices may be simultaneously operated, and second means for operating said first mentioned means from a distant point.

14. In an eye testing apparatus, in combination, a casing, astigmatic, color and muscle testing devices positioned within the casing, mechanical means within the casing thru which said devices may be successively actuated, and second means for operating said first mentioned means from a distant point.

15. In an eye testing apparatus, in combination, a supporting member rotatable about a fixed axis, a plurality of individual chart elements rotatably supported upon said supporting members, a spring retracted member engaging each of said elements for maintaining the same in rotation about its individual axis as the supporting member rotates, and manually controlled means for rotating the chart elements about their axes against the action of said spring.

16. In an eye testing apparatus, in combination, a member having a view aperture therein, a movable supporting member, a chart carried thereby, a series of lamps of different intensities, and means for bringing any one of said lamps in register with said view aperture to illuminate said chart.

17. In an eye testing apparatus, in combination, a member having a view aperture therein, a movable supporting member, a translucent chart carried thereby, a series of electric lamps of different intensities in the rear of said chart, means for bringing a selected one of said lamps in line with said aperture and chart and means to close the circuit of the selected lamp.

18. In an eye testing apparatus, in combination, a cabinet having a front and back, a view aperture in said front, a rotatable member, a series of charts carried thereby, means to rotate said member to bring any individual chart in register with said aperture, a disc rotatably mounted behind said member, a plurality of electric lamps of different intensities on said disc and normally open circuited, means to rotate said disc to bring a selected lamp in line with the aperture and selected chart, and to close its circuit.

19. In an eye testing apparatus, in combination, a casing or support, a movable letter chart, a rotatable member having a plurality of line charts thereon, a meridian dial having blades of variable width and single means for simultaneously operating said chart and rotatable member and varying the width of said blades.

20. In an eye testing apparatus, in combination, a movable letter chart, a series of selectable astigmatic charts, an adjustable meridian dial, color testing discs and a muscle test device, a lamp to illuminate said letter chart, a single lamp for said astigmatic charts and said dial, lamps for said color test discs and a lamp for the muscle test device, single means to simultaneously adjust said letter chart, astigmatic charts and dial, said means controlling all of said lamps in the proper sequence.

21. In an eye testing apparatus, in combination, a meridian dial consisting in a plurality of radial blades, a field or background spaced to the rear of said dial, means for lighting said background comprising a lamp positioned on the axis of the dial, and shield means for controlling the intensity of illumination.

22. In an eye testing apparatus, in combination, a meridian dial consisting in a plurality of radial blades, a field or background spaced to the rear of said dial, means for lighting said background comprising a lamp positioned on the axis of the dial, and means comprising semicircular shields coaxial with said lamp for controlling the intensity of illumination of said field.

23. In an eye testing apparatus, in combination, a meridian dial consisting in a plurality of radial blades, a field or background spaced to the rear of said dial, means for lighting said background comprising a lamp positioned on the axis of the dial, and a pair of similar semicircular shields, coaxial with said lamp, and means for adjusting said shields in respect to each other to control the intensity of illumination of said field.

24. In an eye testing apparatus, in combination, a plurality of adjustable test devices, means to control the adjustment thereof from a distance including a lever operatively connected to said devices, a weight at one end of said lever, a cord connected to said weight and extending to the remote operator, and a counter weight on the remote end of said cord.

In testimony whereof I hereunto affix my signature.

WILLIAM P. REAVES.